(12) United States Patent
Maw et al.

(10) Patent No.: US 8,224,731 B2
(45) Date of Patent: *Jul. 17, 2012

(54) FORM FACTOR IDENTIFICATION

(75) Inventors: Brian Maw, Belmont, CA (US); Ayman Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/163,352

(22) Filed: Jun. 17, 2011

(65) Prior Publication Data

US 2011/0313873 A1  Dec. 22, 2011

Related U.S. Application Data

(63) Continuation of application No. 11/904,471, filed on Sep. 26, 2007, now Pat. No. 8,010,428.

(51) Int. Cl.
*G06Q 40/00* (2012.01)

(52) U.S. Cl. ............................................ 705/35; 705/41

(58) Field of Classification Search ....................... 705/35
See application file for complete search history.

(56) References Cited

U.S. PATENT DOCUMENTS

| | | | |
|---|---|---|---|
| 4,114,027 A | 9/1978 | Slater et al. | |
| 6,325,285 B1 | 12/2001 | Baratelli | |
| 7,318,049 B2 | 1/2008 | Iannacci | |
| 7,356,541 B1 | 4/2008 | Doughty | |
| 7,542,942 B2* | 6/2009 | Peart et al. ...................... | 705/39 |
| 7,962,390 B2 | 6/2011 | Maw et al. | |
| 2003/0121969 A1 | 7/2003 | Wankmueller | |
| 2004/0128243 A1 | 7/2004 | Kavanagh et al. | |
| 2005/0018670 A1 | 1/2005 | Shigematsu et al. | |
| 2005/0080726 A1 | 4/2005 | Krajewski et al. | |
| 2006/0004746 A1 | 1/2006 | Angus et al. | |
| 2007/0055630 A1 | 3/2007 | Gauthier et al. | |
| 2007/0094154 A1* | 4/2007 | Rau et al. ......................... | 705/67 |
| 2007/0131761 A1* | 6/2007 | Smets et al. ................... | 235/380 |
| 2007/0205275 A1 | 9/2007 | Nicola et al. | |
| 2008/0027815 A1* | 1/2008 | Johnson et al. ................. | 705/17 |
| 2008/0040285 A1 | 2/2008 | Wankmueller | |
| 2008/0103968 A1 | 5/2008 | Bies et al. | |
| 2009/0265273 A1 | 10/2009 | Guntupalli et al. | |

FOREIGN PATENT DOCUMENTS

| | | |
|---|---|---|
| KR | 10-0795142 B1 | 1/2008 |
| WO | WO 2006/077281 A1 | 7/2006 |

OTHER PUBLICATIONS

International Search Report and Written Opinion from PCT/US2009/041951, dated Dec. 17, 2009 (11 pages).
International Search Report and Written Opinion from PCT/US2009/041961, dated Nov. 30, 2009 (11 pages).
International Search Report from PCT/US2009/046402, dated Jul. 23, 2009 (2 pages).
Kennedy, Kristen; "The Incredible Shrinking Form Factor"; 2002, CRN, vol. 996, pp. 46-50.
Office Action dated Mar. 16, 2011 from U.S. Appl. No. 12/431,452, 7 pages.

* cited by examiner

*Primary Examiner* — Sarah Monfeldt
(74) *Attorney, Agent, or Firm* — Kilpatrick Townsend & Stockton LLP

(57) ABSTRACT

A payment device, method, and apparatus configured to determine the form factor of the payment device used in a financial transaction, without requiring a different primary account number for each payment device form factor.

17 Claims, 5 Drawing Sheets

| Device Indicator Value | Form Factor | Description |
|---|---|---|
| 0 | Full-size standard card (non-contactless) | Device indicator value initiated from a full-size magnetic stripe card |
| 1 | Full-size standard card | Device indicator value initiated from a full-size contactless card (contactless) MSD chip and magnetic stripe) |
| 2 | Standard mini card (non-contactless) | Device indicator value initiated from a standard mini card |
| 3 | Contactless mini card | Device indicator value initiated from a contactless mini card (contactless MSD chip and magnetic stripe) |
| 4 | Micro tag | Device indicator value initiated from the contactless MSD chip of a Micro tag |
| 5 | Mobile device | Device indicator value initiated from the contactless MSD chip of a mobile device |
| 6 | Alternate card user | Reserved for alternate card user |
| 7 | Alternate card user | Reserved for alternate card user |
| 8 | Alternate card user | Reserved for alternate card user |
| 9 | Reserved | Reserved for future payment device |

FIG. 3

FORM FACTOR IDENTIFICATION

CROSS-REFERENCES TO RELATED APPLICATIONS

This application is a continuation of U.S. patent application Ser. No. 11/904,471, filed Sep. 26, 2007, now U.S. Pat. No. 8,010,428 entitled "FORM FACTOR IDENTIFICATION, the disclosure of which is hereby incorporated by reference in its entirety for all purposes.

BACKGROUND

1. Field of the Invention

Aspects of the present invention relate in general to financial services. Aspects include a payment form factor identification apparatus, system, method and computer-readable storage medium configured to identify the form factor of a payment device.

2. Description of the Related Art

Traditionally, when a consumer cardholder makes a purchase from a merchant, a payment card, such as a debit, credit or charge card, can be used to pay for the transaction. Such payment cards are identified by their unique primary account number (PAN). When multiple cards are issued to an account holder, these cards all share the same primary account number. For example, a husband, wife and child may all share multiple Visa™ cards with the same primary account number, and receive a single consolidated bill. While it may be convenient for a customer to be sent a single bill, purchases made by husband, wife, and child are mixed together on the same bill, and there is no way to identify who made each purchase. The mixing of purchases leads to confusion on who made each purchase, and may also mask fraudulent charges to the account.

Moreover, new form factors of payment devices, such as cell phones, key fobs, and the like are also issued with the same primary account number. As these purchases are made with the same primary account number, it is impossible to identify which payment device was used to pay for a purchase.

SUMMARY

Embodiments of the invention include a system and method configured to identify the payment form factor used in a payment transaction. Despite the fact that the industry does not capture or utilize such information, one aspect of the invention includes the insight that tracking the form factor used would be useful. Moreover, the embodiments of the invention are fully compatible with existing payment card/device implementations, and do not require a different primary account number for each form factor. In one embodiment, a card transceiver/scanner is configured to receive transaction data from the payment device in a financial transaction. The transaction data including a form factor indicator embedded within. A form factor identifier, coupled to the card transceiver/scanner, is configured to parse the form factor indicator from the transaction data. A data processor either transmits the form factor indicator to a payment processor via a network interface, or stores the form factor indicator in a form factor log database.

BRIEF DESCRIPTION OF THE DRAWINGS

FIG. 3 is table showing a device indicator value embodiment configured to identify the payment form factor used in a payment transaction.

DETAILED DESCRIPTION

Although the payment card industry does not currently capture or utilize form factor information, one aspect of the present includes the insight that tracking the form factor used in a financial transaction would be useful to consumers, card issuers, and card payment processors. First, card holders will be able to more easily identify and verify payment transactions through form factor used, identifying fraudulent transactions.

For the purposes of this document, a financial transaction is any operation involving a payment device, whether a payment, reimbursement, or any other interaction using a payment device. Financial transactions may be credit, debit, or charge transactions.

As the embodiments of the invention are fully compatible with existing payment card/device implementations, and they do not require a different primary account number for each payment device form factor.

Embodiments of the present invention include a system, method, and computer-readable storage medium configured to identify the form factor of a payment device used in a financial transaction without requiring a different primary account number for each payment device form factor. Other embodiments of the present invention may include remote terminals configured to capture, encode, or record the form factor information.

Figure 1:
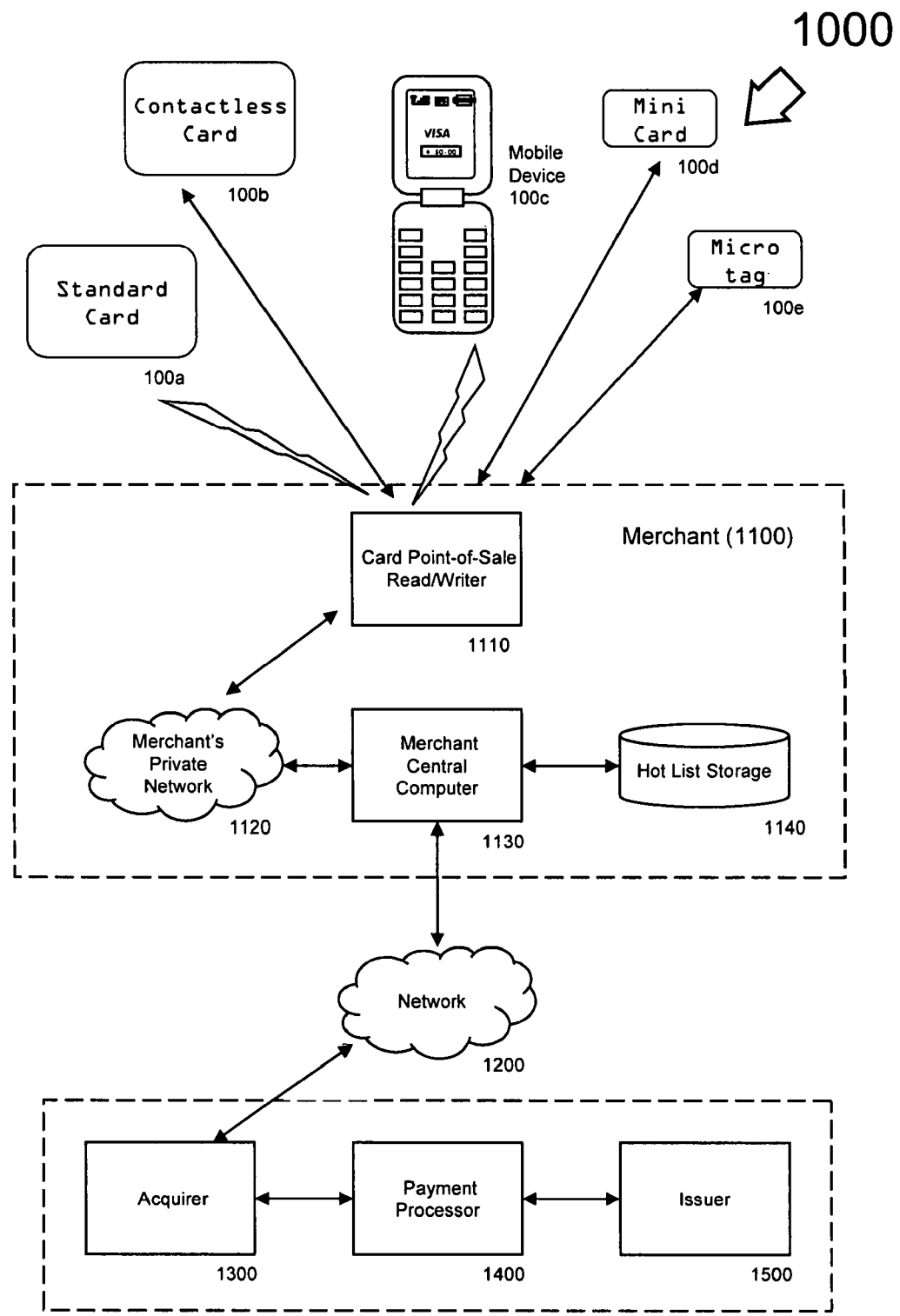
FIG. 1 illustrates an embodiment of a system configured to identify the payment form factor used in a payment transaction.

Turning to FIG. 1, this figure depicts system 1000, configured to identify the form factor of a payment device used in a financial transaction, constructed and operative in accordance with an embodiment of the present invention. In this example, payment device 100 is may be any credit, debit, or charge device. Examples include, but are not limited to a standard payment device 100a, a radio frequency or "contactless" payment device 100b, a mobile phone device 100c, a mini-card 100d, micro tag 100e, payment fob, or any other payment device known in the art. It is understood that embodiments of the present invention may be extended to identify and track future payment devices.

When the consumer uses the payment device 100 at a merchant 1100 to pay for a product or service, the merchant 1100 contacts an acquirer 1300 (for example, a commercial bank) via a network 1200 to determine whether the consumer is credit worthy or the account has sufficient funds on the card to pay for the transaction. The acquirer 1300 forwards the details of the payment transaction to a payment processor 1400 or payment card issuing bank 1500 ("the issuer") for processing.

The merchant 1100 may comprised a point-of-sale read/writer device 1110. Examples of such devices include, but are not limited to: payment terminals, card readers, scanners, cash registers, and the like. In some embodiments of the present invention, a point-of sale reader may substitute for a read/write device 1110. Internal details of point-of-sale read/writer device 1110 are discussed at FIG. 5 below.

A merchant's private network 1120 connects the point-of-sale read/writer 1110 to a merchant central computer 1130. In some instances, a list of fraudulent cards may be stored at a hotlist storage database 1140.

Payment processor 1400 may be any payment network known in the art. Examples of payment networks include: Visa™, MasterCard™, and American Express™.

Issuer 1500 may be any financial institution that issues the payment device 100.

Figure 5:
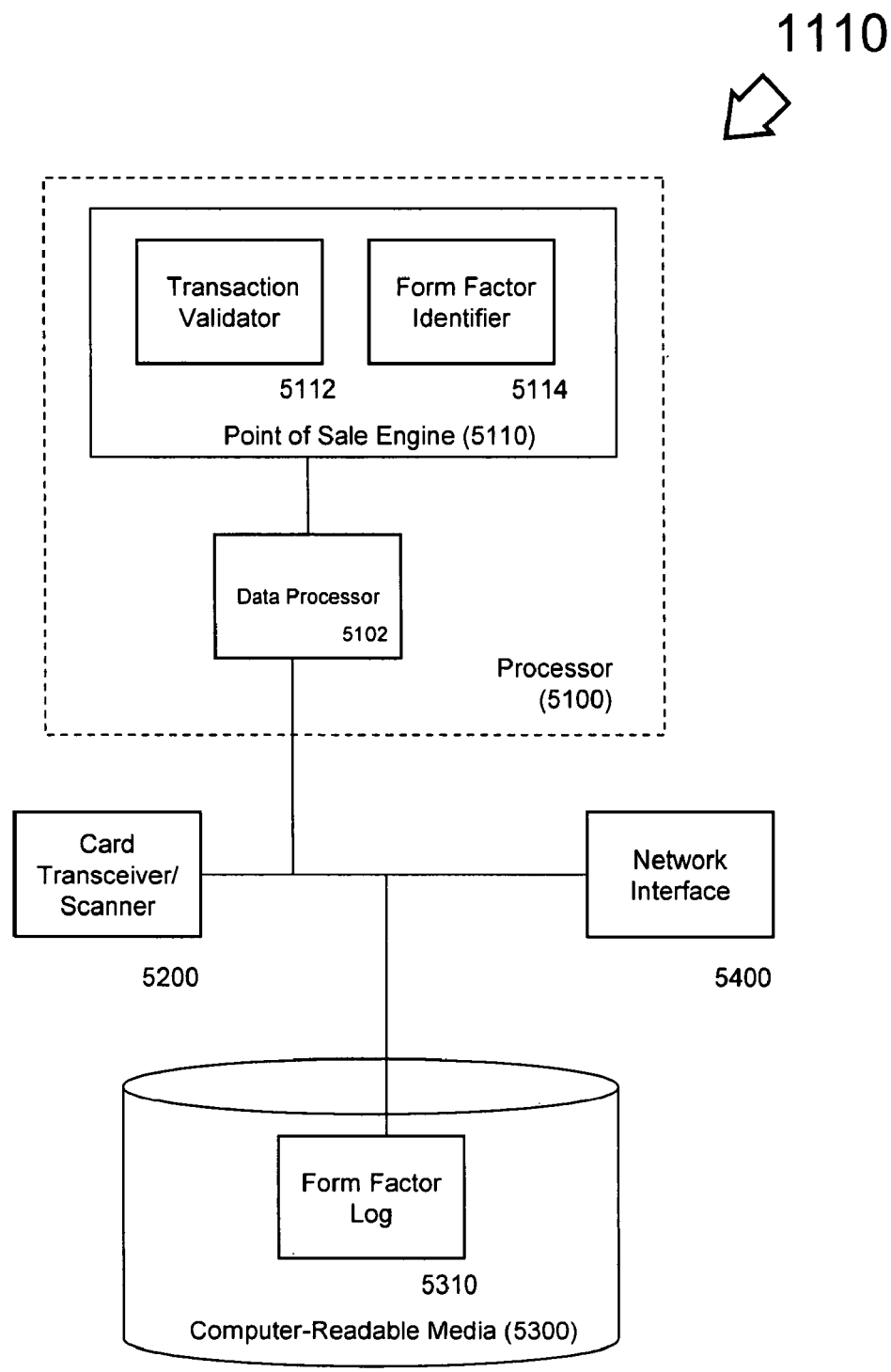
FIG. 5 illustrates a device configured to identify the payment form factor used in a payment transaction.

Embodiments will now be disclosed with reference to a block diagram of an exemplary point-of-sale read/writer device 1110 of FIG. 5, constructed and operative in accordance with an embodiment of the present invention. Point-of-sale read/writer device 1110 may run a multi-tasking operating system (OS) and include at least one processor or central processing unit (CPU) 5100. Processor 5100 may be any central processing unit, microprocessor, micro-controller, computational device or circuit known in the art.

It is well understood by those in the art, that the functional elements of FIG. 5 may be implemented in hardware, firmware, or as software instructions and data encoded on a computer-readable storage medium 5300. As shown in FIG. 5, processor 5100 is functionally comprised of a point-of-sale engine 5110 and data processor 5102. Point-of-sale engine 5110 may further comprise: transaction validator 5112 and form factor identifier 5114. These structures may be implemented as hardware, firmware, or software encoded on a computer readable medium, such as storage media 5300.

Data processor 5102 interfaces with storage medium 5300, card transceiver/scanner 5200 and network interface 5400. The data processor 5102 enables processor 5100 to locate data on, read data from, and writes data to, these components.

Card transceiver/scanner 5200 may be any component known in the art capable of read/writing data to or from payment devices 100. For example, for conventional credit card 100*a* or mini-card 100*d* embodiments, card transceiver/scanner 5200 may read or write to a magnetic strip. Embodiments that communicate with a contactless card 100*b*, mobile phone 100*c*, and micro tag/key fob 100*e* include a wireless transceiver.

Network interface 5400 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 5400 allows point-of-sale read/writer device 1110 to communicate with issuer 1500, and may allow communication with acquirer 1300.

Computer-readable storage medium 5300 may be a conventional read/write memory such as a magnetic disk drive, floppy disk drive, compact-disk read-only-memory (CD-ROM) drive, digital versatile disk (DVD) drive, high definition digital versatile disk (HD-DVD) drive, magneto-optical drive, optical drive, flash memory, memory stick, transistor-based memory or other computer-readable memory device as is known in the art for storing and retrieving data. Significantly, computer-readable storage medium 5300 may be remotely located from processor 5100, and be connected to processor 5100 via a network such as a local area network (LAN), a wide area network (WAN), or the Internet. In addition, as shown in FIG. 5, storage media 5300 may also contain form factor log database 5310. Note that in some embodiments, form factor log database may be located at merchant central computer 1130, payment processor 1400, or issuer 1500. The function of these structures may best be understood with respect to FIGS. 2-4, as described below.

Figure 2:
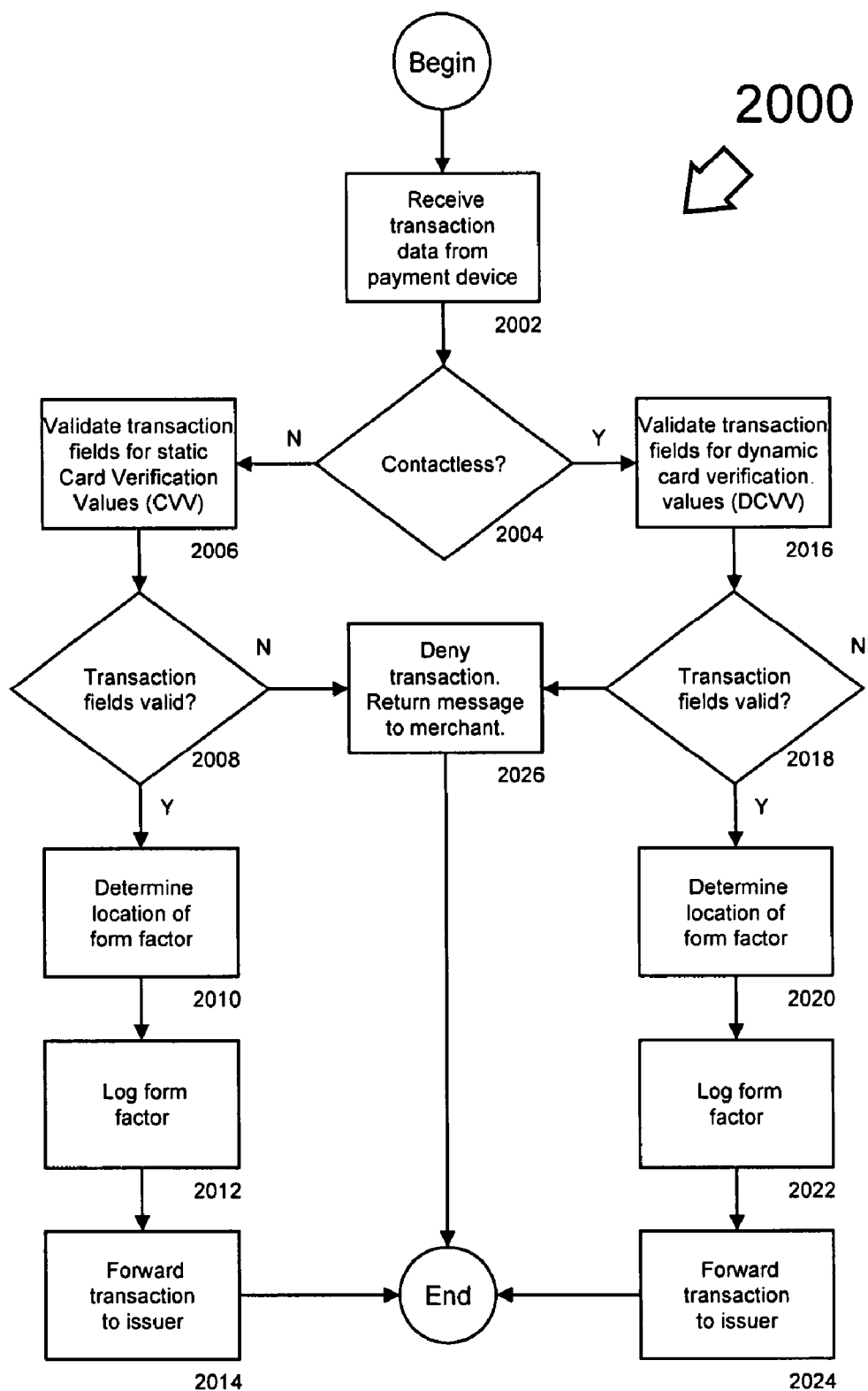
FIG. 2 flowcharts a method embodiment configured to identify the payment form factor used in a payment transaction.

We now turn our attention to method or process embodiments of the present invention, FIG. 2. It is understood by those known in the art that instructions for such method embodiments may be stored on their respective computer-readable memory and executed by their respective processors.

FIG. 2 flowcharts a process 2000 in which point-of-sale read/writer device 1110 is configured to identify the payment form factor used in a payment transaction, constructed and operative in accordance with an embodiment of the present invention. The process begins when the financial transaction starts. At block 2002, point-of-sale read/writer device 1110 receives transaction data (also known as "track 2 equivalent data") from the payment device 100. The transaction data is received as part of an authorization request, as a customer uses payment device 100 to pay for a financial transaction. The data is received via card transceiver/scanner 5200 and includes information such as the primary account number (PAN). Usually, a payment device's Primary Account Number is either a 15 or 16 digit number. The first six digits of a Visa™ or MasterCard™ Primary Account Number identifies the card issuer banking institution 1400 and is known as the "Bank Identification Number" or "BIN." In some embodiments, such as debit transactions, the authorization request may also contain a user verification identifier, such as the customer's personal identification number (PIN) or biometric information.

At decision block 2004, transaction validator 5112 determines whether the data was received via a wireless (contactless) interface. Such interfaces are also known as "paywave" reception. If the payment device is not contactless, process 2000 continues at block 2006. If contactless, the process flow continues at block 2016.

Figure 4:
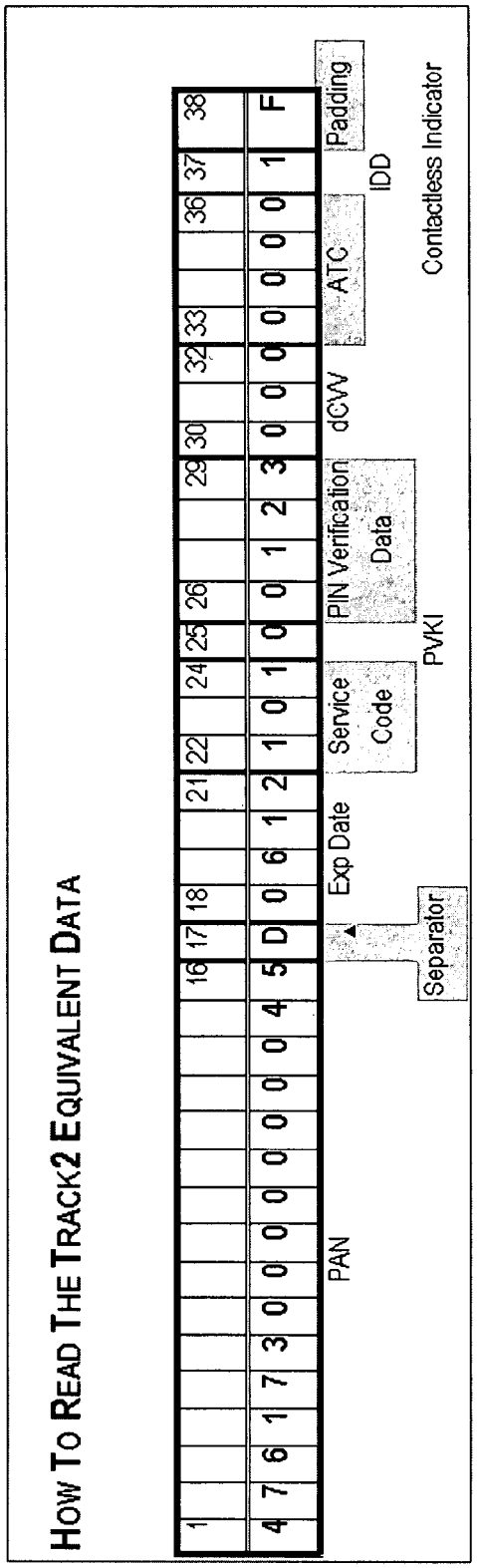
FIG. 4 is a table illustrating track 2 of a card embodiment configured to identify the payment form factor used in a payment transaction.

For the purposes of this example embodiment, non-contactless payment devices 100 are assumed to be encoded with a static magnetic stripe. The magnetic stripe is encoded with an embodiment of track 2 equivalent data, as shown in FIG. 4. As shown in FIG. 4, track 2 equivalent data 4000 includes the primary account number (usually 15-16 digits, but up to 19 digits), a separator (one character) a payment device expiration date (4 digits), a service code (3) digits), and pin verification data. In contactless embodiments, the track 2 equivalent data may also include issuer discretionary data. Traditionally, the issuer discretionary data included a dynamic card verification value code, a one character PIN Verification Key Indicator, and other unused data positions. However, embodiments of the present invention the issuer discretionary data includes a form factor indicator (shown as the "contactless indicator") to be encoded where traditionally unused data positions exist.

FIG. 3 illustrates a table showing a device indicator value 3000 embodiment configured to identify the payment form factor used in a payment transaction, constructed and operative in accordance with an embodiment of the present invention. As shown, device indicator value 3000 reserves values contemplating use of full-size standard non-contactless payment cards 100*a*, a full-size contactless payment card 100*b*, a standard non-contactless mini card 100*d*, a contactless mini-card, a micro tag 100*e*, mobile device 100*c*, and alternate card users. It is understood that device indicator value 3000 embodiments may include some or all of such form factors.

Returning to FIG. 2, at block 2006, transaction validator 5112 verifies the transaction field's card verification value (CVV) code.

The card verification value is an authentication procedure established by credit card companies to further efforts towards reducing fraud for transactions. It consists of requiring a card holder to enter the CVV number in at transaction time to verify that the card is on hand. The CVV code is a security feature for "card not present" transactions (e.g., Internet transactions), and now appears on most (but not all) major credit and debit cards. This new feature is a three- or four-digit code which provides a cryptographic check of the information embossed on the card. Therefore, the CVV code is not part of the card number itself. The CVV code helps ascertain that the customer placing the order actually possesses the credit/debit card and that the card account is legitimate. Each credit card company has its own name for the CVV code, but it functions the same for all major card types. (VISA refers to the code as "CVV2," MasterCard calls it "CVC2," and American Express calls it "CID.")

Merchant 1100, and, in turn, acquirer 1300 seek authorization before performing the transaction.

If the transaction fields are not valid, as determined by decision block 2008, the transaction is denied, and a message is sent to merchant 1100, block 2026.

At block 2010, form factor identifier 5114 determines the location of the device indicator information 3000 from the track 2 equivalent data 4000. The form factor information is read and logged at form factor log database 5310, and forwarded to the issuer at block 2014. Process 2000 the ends.

At block 2016, contactless payment devices are addressed. Such unlike devices with static magnetic strips, contactless devices have dynamic card verification values (DCVV). In such embodiments, a new verification number is generated after each transaction.

If the transaction fields are not valid, as determined by decision block 2018, the transaction is denied, and a message is sent to merchant 1100, block 2026.

At block 2020, form factor identifier 5114 determines the location of the form factor information from the track 2 equivalent data. The form factor information is read from the device indicator value 3000 and is logged, block 2022, and forwarded to the issuer at block 2024. Process 2000 the ends.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A first payment device comprising:
a body; and
a computer readable medium disposed on or within the body, the computer readable medium comprising code for transaction data including a primary account number, an expiration date, and a form factor indicator value configured to indicate a form of the first payment device, wherein the form factor indicator value distinguishes among different physical forms of payment devices, wherein the transaction data is used in an authorization request message for a transaction associated with the payment device, the authorization request message requesting approval of the transaction.

2. The first payment device of claim 1, wherein the form factor indicator value indicates that the first payment device is a full-size non-contactless card.

3. The first payment device of claim 1, wherein the form factor indicator value indicates that the first payment device is full-size contactless card.

4. The first payment device of claim 1, wherein the form factor indicator value indicates that the first payment device is a mini non-contactless card.

5. The first payment device of claim 1, wherein the form factor indicator value indicates that the first payment device is a mini contactless card.

6. The first payment device of claim 1, wherein the form factor indicator value indicates that the first payment device is a micro tag.

7. The first payment device of claim 1, wherein the form factor indicator value indicates that the first payment device is a mobile device.

8. A method of identifying a form factor of a payment device during a financial transaction, comprising:
receiving transaction data from the payment device at a point-of-sale apparatus, the transaction data including a form factor indicator value stored on the payment device, wherein the form factor indicator value indicates the physical form of the payment device and distinguishes among different physical forms of payment devices;
parsing the form factor indicator value from the transaction data; and
either transmitting the form factor indicator value to a payment processor or storing the form factor indicator value in a form factor log database, wherein the transaction data is used in an authorization request message for the financial transaction, the authorization request message requesting approval of the financial transaction.

9. The method of claim 8, further comprising:
determining whether the payment device is a contactless payment device.

10. The method of claim 8, further comprising:
validating a card verification value (CVV) or a dynamic card verification value (DCVV) associated with the payment device.

11. A system comprising:
a first payment device comprising a first body and a first computer readable medium disposed on or within the first body, the first computer readable medium comprising code for transaction data including a primary account number and a first form factor indicator value configured to indicate a form of the first payment device, wherein the first form factor indicator value distinguishes among different physical forms of payment devices; and
a second payment device associated with the first payment device comprising a second body and a second computer readable medium disposed on or within the second body, the second computer readable medium comprising code for transaction data including the primary account number and a second form factor indicator value configured to indicate a form of the second payment device.

12. The system of claim 11, wherein the first form factor indicator value indicates a physical form of the first body and wherein the second form factor indicator value indicates a physical form of the second body.

13. The first payment device of claim 1, wherein the form factor indicator value is stored in the Track 2 data of the first payment device.

14. The method of claim 8, wherein the transaction data is received from the payment device via a wireless interface.

15. The method of claim 8, wherein the point-of-sale apparatus is a point-of-sale read/write device configured to receive transaction data, identify the payment form factor used in a payment transaction from the transaction data, and log the form factor indicator value associated with the payment transaction in the form factor log database.

16. The method of claim 15, wherein the point-of-sale read/write device is a payment terminal, a card reader, a scanner, or a cash register.

17. The method of claim 9, wherein a transaction validator determines whether the payment device is a contactless payment device.

* * * * *